[11] 3,627,405

| | | | |
|---|---|---|---|
| [72] | Inventors | Martin Feldman<br>Springfield;<br>Jack Page Griffin, Short Hills, both of N.J. | |
| [21] | Appl. No. | 39,583 | |
| [22] | Filed | May 22, 1970 | |
| [45] | Patented | Dec. 14, 1971 | |
| [73] | Assignee | Bell Telephone Laboratories, Incorporated<br>Murray Hill, N.J. | |

[54] ACOUSTO-OPTIC LIGHT DEFLECTION
3 Claims, 3 Drawing Figs.

[52] U.S. Cl......................................................... 350/161,
350/160, 350/292, 350/299
[51] Int. Cl......................................................... G02b 5/08
[50] Field of Search........................................... 350/161,
292, 299, 160, 285

[56] References Cited
UNITED STATES PATENTS
3,279,341 10/1966 Arkell et al................... 350/160
3,459,466 8/1969 Giordmaine................... 350/160
3,517,386 6/1970 Jones............................. 350/96 B
3,544,200 12/1970 Boll............................... 350/285

*Primary Examiner*—Ronald L. Wibert
*Assistant Examiner*—J. Rothenberg
*Attorneys*—R. J. Guenther and Kenneth B. Hamlin

ABSTRACT: Two orthogonally disposed acousto-optic deflectors produce a rectangular matrix of light spots in the usual way. A series of mirrors arranged to form a staircase convert the rectangular matrix to a close approximation of a linear array. The number of resolvable spots in the linear array is equal to the product of the capacities of the individual deflectors. In turn, by adding a third acousto-optic deflector the linear array can be expanded to form an enlarged rectangular matrix. In principle, this process can be repeated as often as desired, thereby to realize relatively simple light deflection systems characterized by advantageous capacity-speed products.

INVENTORS: M. FELDMAN
J. P. GRIFFIN
BY:
*Lucian C. Canepa*
ATTORNEY

ACOUSTO-OPTIC LIGHT DEFLECTION

This invention relates to an arrangement for selectively deflecting light beams and, more particularly, to such an arrangement that includes cascaded acousto-optic deflectors.

BACKGROUND OF THE INVENTION

The deflection of light by acoustic Bragg diffraction is of considerable practical importance. In a deflection device based on this phenomenon the angle through which incident light is deflected is approximately proportional to the frequency of an acoustic wave applied to the device. The angular range of the deflector and thus its "capacity," i.e., the number of resolvable angular positions to which the light can be deflected, is proportional to the frequency bandwidth of the deflector. Frequency-dependent sound absorption and a reduction in deflection efficiency as the deflection angle departs from the optimum or "Bragg" angle set a practical limit to this bandwidth. The capacity is also proportional to the width of the incident light beam and therefore to the time required for acoustic energy to fill the optical aperture. A given deflector material, operating with a fixed bandwidth, thus maintains a constant capacity-speed product as its aperture is varied.

Various schemes have been heretofore proposed to increase the effective capacity-speed product of a deflection array composed of acousto-optic deflectors each having a limited bandwidth. In one such prior proposal two or more identical deflectors are placed next to each other such that each occupies only a fraction of the optical aperture, and acoustic energy is applied individually to the deflectors. In that way the filling time (and hence the access time or speed) of the overall configuration is less than if a single deflector occupying the entire aperture were used. However, a disadvantage of that approach is that the total power required to drive the deflectors is greater than what is needed in the single deflector case. A more serious disadvantage of that approach is that the relative phases of the acoustic signals supplied to the deflectors must be a closely controlled function of frequency.

Another known approach is to utilize two deflectors in tandem with a multifaceted prism therebetween. The prism introduces large gaps between the angular positions resolved by the first deflector. In turn the second deflector directs light into angular positions within these gaps. In that arrangement, with identical deflectors and for a given speed, the capacity relative to a single deflector is squared. A drawback of that scheme, however, is that accurate relative phasing of several transducers as a function of frequency must be established to provide high deflection efficiency over the relatively wide angular range accommodated by the second deflector.

SUMMARY OF THE INVENTION

An object of the present invention is an improved light deflection arrangement.

More specifically, an object of this invention is a light deflection arrangement that includes plural cascaded acousto-optic deflectors.

Another object of the present invention is an acousto-optic light deflection arrangement that is relatively simple and which exhibits an advantageous capacity-speed product.

Briefly, these and other objects of the present invention are realized in a specific illustrative embodiment thereof in which two orthogonally disposed deflectors produce a rectangular array of light spots (one spot at a time) in a conventional manner. A series of mirrors arranged to form a staircase convert the rectangular array to a close approximation of a linear array. The number of resolvable spots in the linear array is equal to the product of the capacities of the individual deflectors, and the access time therefor, assuming identical deflectors each characterized by an access time of $t$ seconds, is $t$ seconds.

In accordance with the principles of the present invention, the above-described linear array is directed by a lens to a third acousto-optic deflector which is adapted to deflect incident light in a direction normal to the line array. Significantly, the Bragg condition is approximately satisfied for each of the incident beams from the line array. Hence, a new rectangular array can be thereby formed by the third deflector. In principle, this process can be repeated as often as desired. With each additional deflection stage, the number of addressable locations can be multiplied by the capacity of the added stage.

A feature of the present invention is that the individual rows (or columns) of a conventional rectangular matrix of target areas are reconstituted by a light-directing device to form an approximately linear array of target areas.

Another feature of this invention is that an acousto-optic deflector responds to the reconstituted linear array by forming an enlarged rectangular matrix of target areas.

A further feature of the present invention is that further expansions of the enlarged rectangular matrix can be achieved by successively converting the enlarged matrix to an expanded linear array, then enlarging the expanded array and so forth.

DETAILED DESCRIPTION

The phenomenon underlying the mode of operation of the acousto-optic deflectors to be described hereinbelow is that of Bragg diffraction, which is described, for example, by E. I. Gordon in the *Proceedings of the IEEE*, Oct. 1966, pp. 139–1401.

Figure 1A:
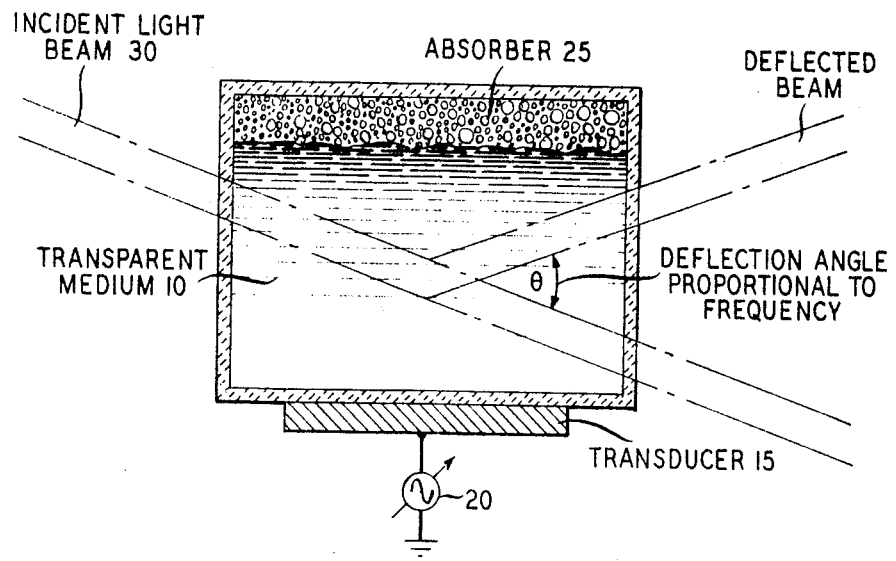
FIG. 1A shows a prior art acousto-optic deflector whose mode of operation is based on Bragg diffraction.

Bragg diffraction can be explained with the aid of the prior art arrangement schematically shown in FIG. 1A. Ultrasonic waves are launched into a transparent medium 10 (such as, for example, water or alpha iodic acid) by electrically activating a transducer 15 by means of a variable-frequency generator 20. (Waves so launched in the medium 10 are absorbed at the far end thereof by any suitable absorber 25.) Accompanying the launched wave is a periodic modulation of the index of refraction of the medium 10, which results from the alternate compression and rarefaction of the medium by the ultrasonic wave. The net result, in effect, is the production in the medium of a three-dimensional diffraction grating.

An incident light beam 30 is directed through the medium 10 as shown in FIG. 1A. A portion of the beam incident on the ultrasonic grating at or near a certain special angle called the Bragg angle is scattered through an angle that depends on the grating spacing (that is, on the ultrasonic wavelength). In fact, for the small-scattering angles (of the order of 1°) normally encountered in practice, this deflection angle is nearly proportional to frequency. Thus, by changing the ultrasonic frequency in steps, one can obtain a sequence of discrete beam deflections.

In an acousto-optic deflector of the type illustrated in FIG. 1A, the range of achievable deflection angles is proportional to the bandwidth over which acoustical energy can be injected into the medium 10. Moreover, in order to get efficient deflection, it is necessary that the incoming light beam and the diffracted (deflected) beam fulfill, or approximately fulfill, the Bragg condition with respect to the acoustical wave front. (A maximum output of light from the deflector shown in FIG. 1A is obtained when the plane tangential to the ultrasonic wave front bisects the deflection angle $\theta$.) If the direction of the acoustical wave front is fixed with respect to the incident light beam, it is apparent that there is only a limited range of angles for which the Bragg condition is satisfied or approximately satisfied.

By means of the arrangement shown in FIG. 1A (which constitutes what will be referred to hereinafter as a vertical deflector) it is possible to direct an incident light beam to any one of a plurality of target areas disposed along a vertical straight line. Furthermore, it is known to cascade two such deflectors (one rotated 90° with respect to the other) to form a conventional x-y deflection arrangement. Such an arrangement is depicted in simplified schematic form in FIG. 1B. In the interest of not obscuring the basic arrangement intended to be portrayed by FIG. 1B, no focusing lenses, aperture-limiting devices or other conventional optical elements, whose nature and utilization are well known in the art, have been shown in FIG. 1B. Similarly, undeflected light, which passes through the deflectors without interacting therewith, has been omitted from the drawing.

Figure 1B:
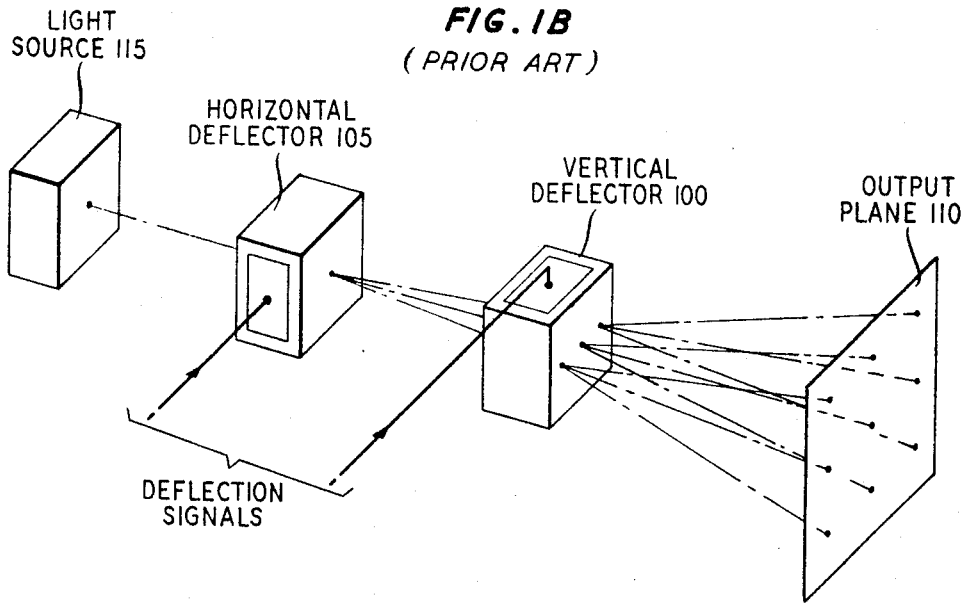
FIG. 1B depicts two such acousto-optic deflectors arranged in an orthogonal fashion to deflect an incident light beam to any one of a plurality of target areas which form the rows and columns of a matrix array.

In FIG. 1B, vertical deflector 100 may be identical to the unit shown in FIG. 1A. In addition, horizontal deflector 105 is identical to the deflector 100 but is orthogonally oriented with respect thereto. For illustrative purposes it is assumed that the unit 105 is capable, under the control of applied deflection signals, of deflecting an incident light beam to any one of three target areas disposed along a horizontal straight line. These areas are assumed to fall within the entry or left-hand face of the vertical deflector 100. In turn, the unit 100 is adapted to deflect a beam directed at any specified one of these three areas to three target areas disposed in a vertical straight line with the specified area. As a result, the cascaded deflectors 100 and 105 are effective to deflect an incident light beam to any selected one of nine target areas arranged in a matrix of rows and columns. In FIG. 1B these nine areas are represented by dots positioned in a so-called output plane 110.

The light beam directed at the deflectors 100 and 105 to FIG. 1B is provided by a source 115. Illustratively, this source comprises a laser whose output is a collimated light beam with a circular cross section, which is typical of a laser operating in the $TEM_{00}$ transverse mode. Other types of sources such as, for example, expanded or contracted laser beams, higher order laser beams, collimated and/or filtered arc discharges or other light sources also may be employed to provide a light beam to be deflected by the depicted apparatus.

In accordance with the principles of the present invention, a rectangular matrix comprising $n$ target areas arranged as shown in FIG. 1B is reconstituted to form a substantially linear array having $n$ target areas. An illustrative apparatus for accomplishing this reconstitution is shown in FIG. 2.

Figure 2:
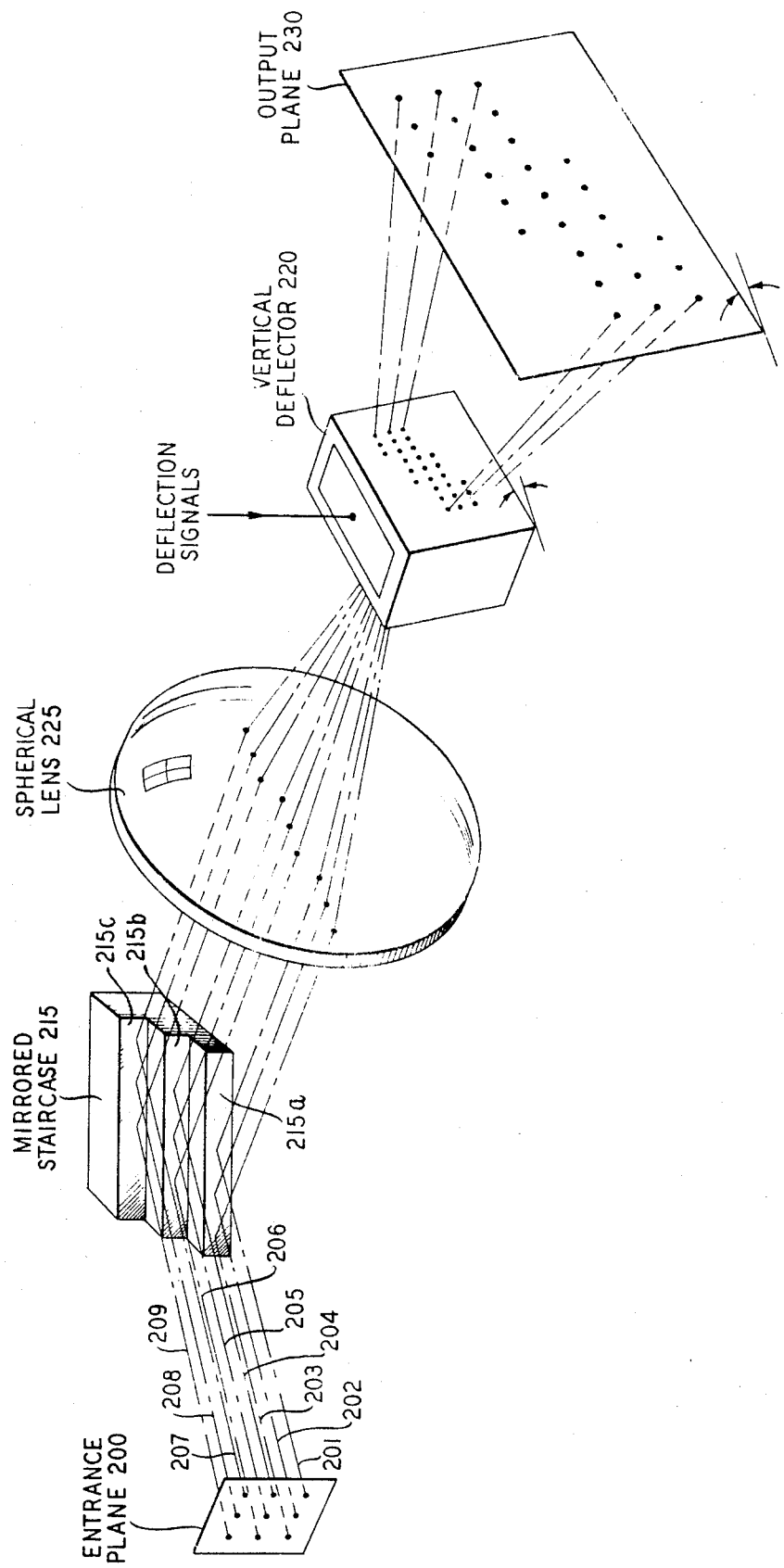
FIG. 2 shows a specific illustrative apparatus made in accordance with the principles of the present invention for selectively converting and enlarging the rectangular array provided by the FIG. 1 arrangement.

In FIG. 2 an entrance plane 200 is depicted. This plane may be regarded as being coplanar with the output plane 110 of FIG. 1B. Accordingly, nine lines 201 through 209 are shown emanating from the plane 200 from respective target areas designated by dots. Each of these lines is representative of one possible propagation path of the light beam supplied by the source 115 and deflected by the units 100 and 105 (FIG. 1B). Positioned in alignment with each row of possible paths emanating from the plane 200 is a highly reflective surface of a mirrored staircase 215. In the specific illustrative embodiment shown in FIG. 2, a plane mirror surface 215a is disposed to reflect the light beams propagated along the paths 201 through 203. Similarly, surfaces 215b and 215c, whose planes are parallel to each other and to the surface 215a, are positioned to reflect beams propagated along the paths 204 through 206 and 207 through 209, respectively. By way of illustration, each of the surfaces 215a, 215b and 215c is oriented at 45° with respect to the entrance plane 200.

It is evident that the mirrored staircase 215 of FIG. 2 is effective to unstack the rectangular array (comprising nine target areas in the entrance plane 200) and to convert that array to a staggered line having three segments each with three target areas. Such a staggered linear array is useful in many applications of practical importance. If desired, however, a standard cylindrical lens (not shown) may be utilized to minimize the offsets among the three noted line segments whereby the departure from a single straight line array is thereby minimized.

Importantly, all the propagation paths traversed by light beams reflected from the risers of the staircase 215 of FIG. 2 are parallel to each other. Hence, a beam propagated along any one of these parallel paths is adapted to be efficiently deflected by a third acousto-optic deflector. As a practical matter, however, such a third deflector might in some applications have to be undesirably (or unattainably) large in physical size. Hence, it is generally advantageous to modify the propagation paths so that a relatively small deflector will suffice to accomplish further deflection of incident beams. Illustratively, such a modification of the paths may be achieved by means of a conventional spherical lens 225 which directs beams received from the staircase 215 to the third deflector 220 (which is assumed to have a capacity of three resolvable target areas). The lens 225 introduces appreciable angles among the depicted propagation paths, but, significantly, all these paths deviate only slightly from lying in a single plane as they traverse the unit 220 (which is oriented to function as a nearly vertical deflector). Accordingly, the Bragg condition is approximately satisfied in the deflector 220 regardless of which path an input beam traverses. Hence, high-efficiency deflection in the unit 220 is realized.

Advantageously, the lens 225 shown in FIG. 2 is tilted at an angle with respect to a plane perpendicular to the paths that extend between the staircase 215 and itself (the lens). More specifically, the lens 225 is tilted in a manner well known in the art to compensate for the spread in focusing caused by the differing path lengths from the mirrored staircase.

The staggered plural-segment line provided by the mirrored staircase 215 of FIG. 2 is characterized by an uphill average slope. Accordingly, the vertical deflector 220 should advantageously be tipped from an exactly vertical orientation by an amount which causes the upper face thereof to have a slope equal in magnitude and direction to the average slope of the staircase.

The deflector 220 is a conventional unit that is adapted to direct each of nine differently oriented incident beams to any one of three discrete output positions. The resulting 27 target areas to which an input beam may be directed are represented by dots in an output plane 230. The array of areas in the output plane 230 may be regarded as an enlarged version of the rectangular array in the entrance plane 200. As is evident in FIG. 2, the enlarged array does not literally constitute a single enlarged rectangle, but instead comprises three rectangular sections each having the same number of target areas indicated in the entrance plane 200. If desired, however, this three-section array can be converted by mirrors, in a manner well known in the art, to a single nearly rectangular array.

The number of resolvable spots in the output plane 230 is seen to be the product of the individual capacities of the aforedescribed deflectors 100, 105 and 220 shown in FIGS. 1B and 2. The time required to randomly access any one of the areas represented in the plane 230 is determined by the speed of the slowest one of the deflectors 100, 105 and 200. As is well known in the art, a larger number of resolvable spots may be realized in the plane 230 at the expense of an increase in access time therefor.

In accordance with the principles of this invention, it is feasible to reconstitute the array of target areas represented in the output plane 230 of FIG. 2. This may be done, for example, by directing the output of the vertical deflector 220 at a mirrored staircase (not shown) having five highly reflective riser surfaces each in alignment with a respective row of the array represented in the output plane 230. By following such a staircase with another spherical lens and then another vertical deflector, further expansions of the target area may easily be achieved. Still further expansions may be carried out by cascading additional elements of the type described.

Finally, it is to be understood that the above-described arrangements are only illustrative of the application of the principles of the present invention. In accordance with these principles, numerous other arrangements may be devised by those skilled in the art without departing from the spirit and scope of the invention. For example, the unstacking accomplished by the staircase element 215 may also be done with a series of oblique optical flats or by wedges, in a manner apparent to those skilled in the art.

What is claimed is:

1. In combination, means for supplying a light beam, means interposed in the path of said beam for directing it to any specified one of a plurality of target areas disposed in a rectangular matrix array of rows and columns, and means interposed in the path of the beam directed at any one of the areas in said matrix for directing said beam to a corresponding one of a plurality of target areas disposed in a multisegment staggered line array, wherein said second-mentioned means for directing comprises a mirrored staircase having a plurality of highly reflective risers each positioned in alignment with a different row of said matrix.

2. A combination as in claim 1 further including redirecting means responsive to a beam directed at any one of the areas in said line array for directing said beam to any one of a plurality of output target areas disposed along a straight line which is perpendicular to the segment in which said one line array area lies.

3. A combination as in claim 2 wherein said redirecting means comprises a spherical lens and an acousto-optic deflector interposed in that order between said mirrored staircase and an output plane which contains said output target areas.

* * * * *